(12) United States Patent
Hilliard

(10) Patent No.: US 11,953,148 B2
(45) Date of Patent: Apr. 9, 2024

(54) CAMERA MOUTH MOUNT

(71) Applicant: Chronos X LLC, Eustis, FL (US)

(72) Inventor: Benjamin Hilliard, Eustis, FL (US)

(73) Assignee: Chronos X LLC, Eustis, FL (US)

( * ) Notice: Subject to any disclaimer, the term of this patent is extended or adjusted under 35 U.S.C. 154(b) by 320 days.

(21) Appl. No.: 17/486,337

(22) Filed: Sep. 27, 2021

(65) Prior Publication Data
US 2022/0099249 A1    Mar. 31, 2022

Related U.S. Application Data

(60) Provisional application No. 63/136,670, filed on Jan. 13, 2021, provisional application No. 63/083,162, filed on Sep. 25, 2020.

(51) Int. Cl.
*F16M 13/04*    (2006.01)
*G03B 17/56*    (2021.01)

(52) U.S. Cl.
CPC ........... *F16M 13/04* (2013.01); *G03B 17/561* (2013.01)

(58) Field of Classification Search
CPC .................................................. G03B 17/561
See application file for complete search history.

(56) References Cited

U.S. PATENT DOCUMENTS

| | | | | |
|---|---|---|---|---|
| 5,031,611 A | * | 7/1991 | Moles | B63C 11/186 128/207.14 |
| 5,305,741 A | * | 4/1994 | Moles | B63C 11/186 128/207.14 |
| 9,983,463 B1 | * | 5/2018 | Rohrer | G03B 17/561 |
| 2004/0103905 A1 | * | 6/2004 | Farrell | A63B 71/085 128/859 |
| 2011/0185525 A1 | * | 8/2011 | Stapelbroek | A63B 71/085 433/25 |
| 2013/0133648 A1 | * | 5/2013 | Beach | B63C 11/186 128/207.14 |
| 2015/0253651 A1 | * | 9/2015 | Russell | G03B 17/563 224/181 |
| 2015/0309396 A1 | * | 10/2015 | Rohrer | G03B 17/561 224/181 |
| 2015/0316205 A1 | * | 11/2015 | Bennett | G03B 17/563 224/181 |
| 2016/0266474 A1 | * | 9/2016 | Russell | G03B 17/561 |

* cited by examiner

*Primary Examiner* — Brian D Nash
(74) *Attorney, Agent, or Firm* — The Dobrusin Law Firm, PC

(57) ABSTRACT

The mouth mount of the present specification discloses an assembly for using a POV camera by means of a mouth. The mouth mount includes a bite portion and a mount portion. The bite portion of the mouth mount enable stabilization of the mount and camera while in use. Further, increased ventilation allows a user to breathe easier as compared to prior known similar products.

10 Claims, 5 Drawing Sheets

US 11,953,148 B2

CAMERA MOUTH MOUNT

CROSS REFERENCE TO RELATED APPLICATIONS

This application claims priority and benefit to U.S. provisional application Ser. No. 62/083,162 filed on Sep. 25, 2020, and 63/136,670 filed on Jan. 13, 2021.

TECHNICAL FIELD

The present specification generally relates to camera mounts and, more specifically, to a hands-free device for holding using a human mouth.

BACKGROUND

Typically, camera devices are handheld. During operation, the user must use at least one hand or strap the camera to the body to hold the camera. With an increase in Point-of-View (POV) action cameras (such as GoPro®), users of the camera are also performing the activity being recorded. This allows the viewer of the recording to see the activity from the participant's perspective, or point of view (hereinafter "POV"). This presents the challenge of ensuring the participant in the activity does not hold the camera. Existing solutions allow the operator/participant to mount the camera to the bike/helmet/board/car, etc. that is involved in the activity in a hands-free operation. However, when using these types of mounting devices, the activity is recorded from an un-natural perspective or POV. Additionally, many of the sports that require safety head gear, do not allow cameras to be mounted thereon. Cameras are not suited for a helmet camera mounted on the helmet due to the excessive movement caused by the weight of the camera, resulting in poor quality recordings. Similar problems exist for cameras that user a camera mount on the body or in sports that do not require a helmet (such as surfing or other similar watersports).

Accordingly, there exists a need in the art to provide an improved camera mount overcoming the aforementioned disadvantages.

SUMMARY

A mount for holding a camera by means of a user's mouth including a base, the base having an upper surface, a lower surface, and a pair of opposed sidewalls connecting the upper surface to the lower surface, an overmold formed around the base, the overmold having a bite portion extending away from the base, the lower surface positioned between a connection portion and the bite portion, and an aperture extending through both the overmold and the lower surface of the base, the aperture used to facilitate breathing by the user when the mount is in use.

In some embodiments, the aperture covers at least 25% of the lower surface of the base so as to improve air flow. In other embodiments, the aperture covers at least 50% of the lower surface of the base so as to improve air flow.

In some embodiments, the aperture is generally rectangular in shape. In other embodiments, the aperture is generally square in shape. In some embodiments, the aperture includes an elevated lip extending around the peripheral edge of the aperture. In some embodiments, wherein the aperture is positioned on a generally planar portion of the lower surface.

In other embodiments, a mount for holding a camera by means of a user's mouth including a base, the base having an upper surface, a lower surface, and a pair of opposed sidewalls connecting the upper surface to the lower surface, and an overmold formed around the base, the overmold having a bite portion extending away from the base, the bite portion having at least one bridge extending between each bite portion, the at least one bridge configured to rest adjacent to portions of their mouth. In some embodiments, there are two total bridges are provided including an upper and lower bridge. Further, the bite portion includes an upwardly extending lip, the bite portions extending generally perpendicularly away from the upwardly extending lip.

BRIEF DESCRIPTION OF THE DRAWINGS

The embodiments set forth in the drawings are illustrative and exemplary in nature and not intended to limit the subject matter. The following detailed description of the illustrative embodiments can be understood when read in conjunction with the following drawings, where like structure is indicated with like reference numerals and in which.

DETAILED DESCRIPTION

The apparatus of the present specification discloses an assembly for using a POV camera by means of a mouth. The mouth mount includes a bite portion and a mount portion. The bite portion of the mouth mount enable stabilization of the mount and camera while in use. Further, increased ventilation allows a user to breathe easier as compared to prior known similar products.

Figure 1:
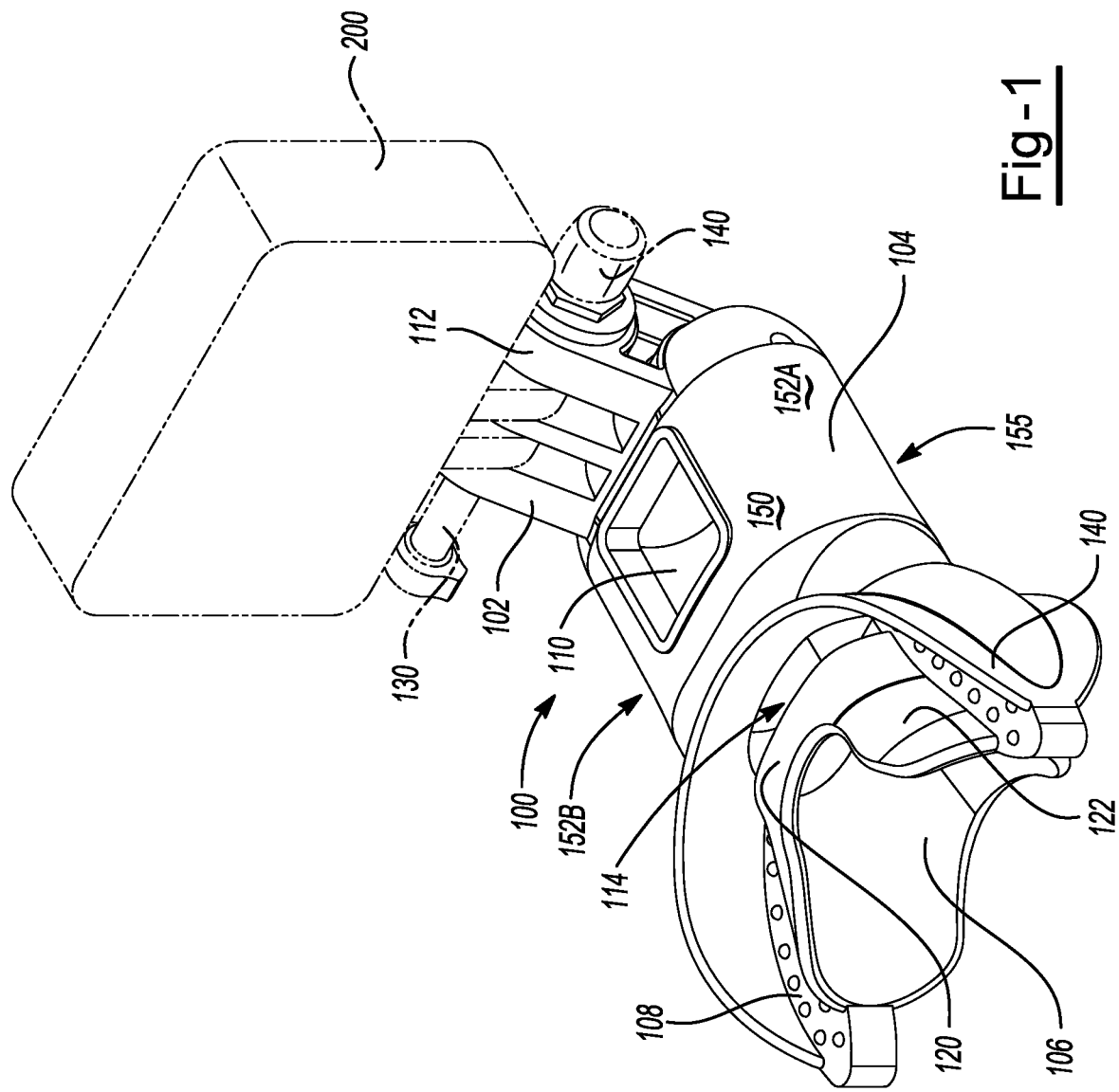
FIG. 1 depicts a perspective view of an improved mouth mount including the base and overmold according to one or more embodiments shown and described herein.

FIG. 1 illustrates the mouth mount 100 as shown in a perspective view illustrating the bottom of the mouth mount. The mouth mount 100 includes a base 102 and in overmold 104. The base 102 includes a connector portion 112 configured to connect directly to a camera 200, such as a GoPro®. The camera 200 is connected to the connector portion 112 to the by means of a screw 130 having a bolt or similar nut 140 to secure the camera to the base 112. The base 102 includes a large aperture 110 extending into the base and the overmold 104. The aperture 110 is in fluid communication with the main opening 114. The main opening 114 is directly adjacent to the mouth bite portion 106 of the mouth mount 100. The bite portion 106 is configured similar to a snorkel in that the user can fit the bite portion 106 into their mouth. The flange is 108 of the bite portion 106 allow the user to position the flange is 108 between your teeth so as to further secure the mouth mount 100.

The aperture 110 is positioned on a lower surface 150 of the base. The lower surface 150 is opposed from the upper surface 155. A pair of sidewalls 152, 152B space apart the upper surface 155 from the lower surface 150. The aperture can 110 occupy a large surface area of the lower surface (anywhere from 10%-80%) so as to improve airflow.

In the present embodiment, the mouth mount 100 is formed by molding the overmold 104 directly to the base 102.

Figure 2:
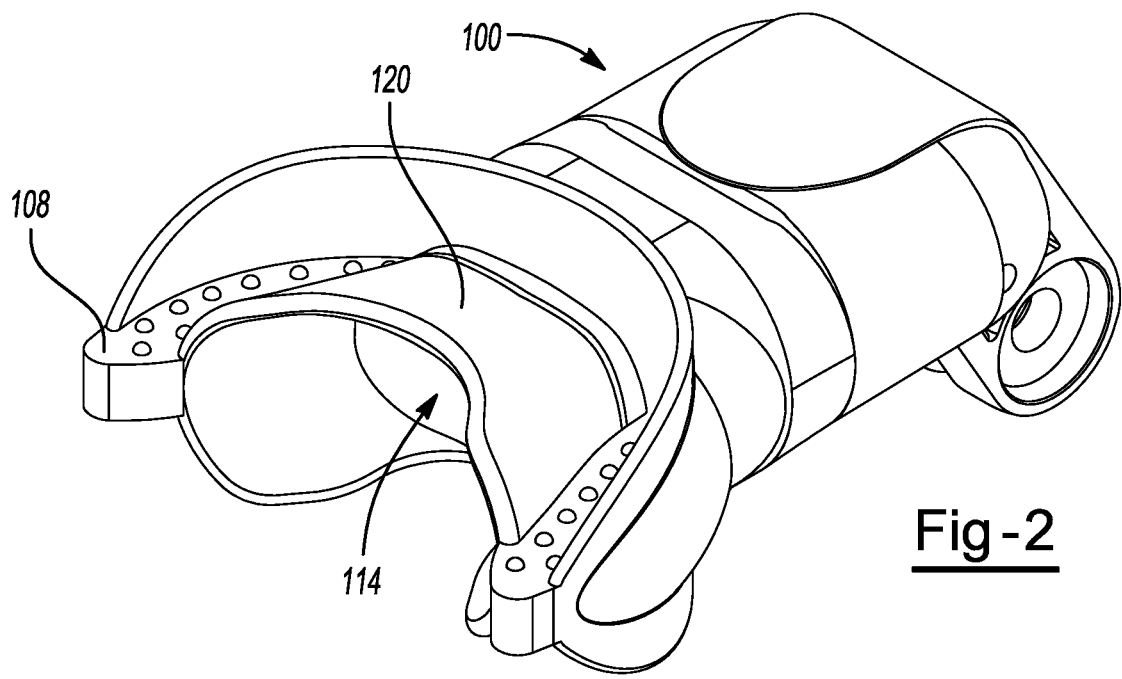
FIG. 2 depicts an alternative perspective view of an improved mouth mount including the base and overmold according to one or more embodiments shown and described herein.
Figure 3:
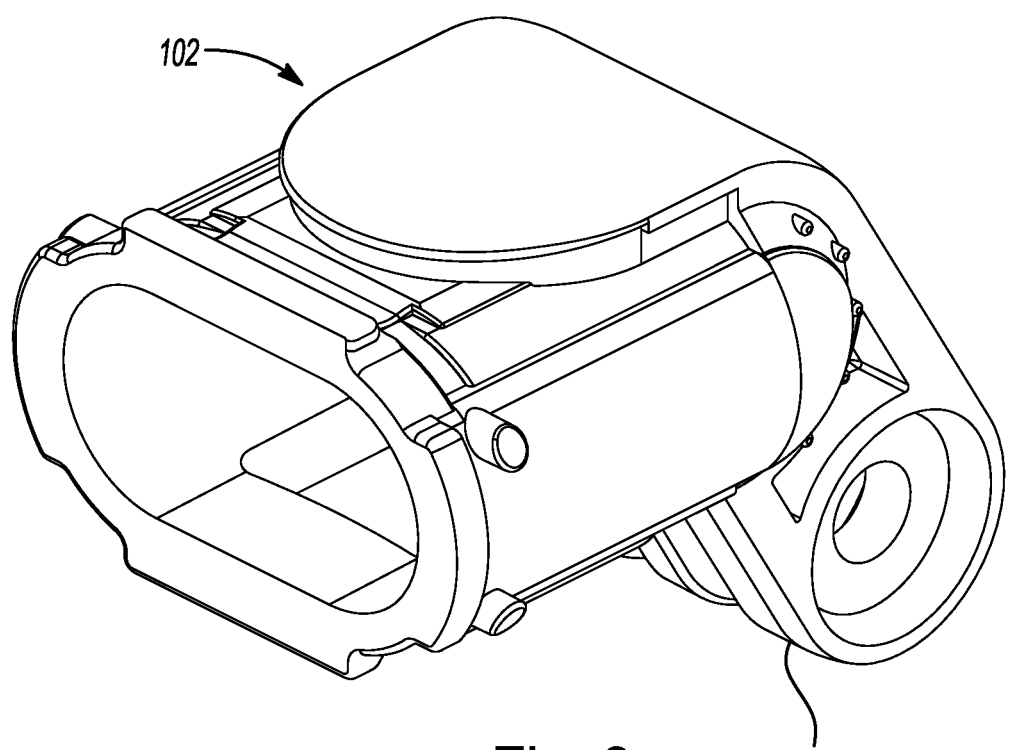
FIG. 3 depicts a perspective view of the base of the improved mouth mount according to one or more embodiments shown and described herein.

The camera is configured to connect directly to the base and extend downward away from the users face while in use. When in use, the user holds the bite portion 106 in their mouth so as to facilitate a smoother video recording while the user is using the camera during sports activities, such as surfing. FIG. 2 further illustrates the single ventilation aperture, such as illustrated in FIG. 1, is the only ventilation in the mouth mount 100.

Figure 4:
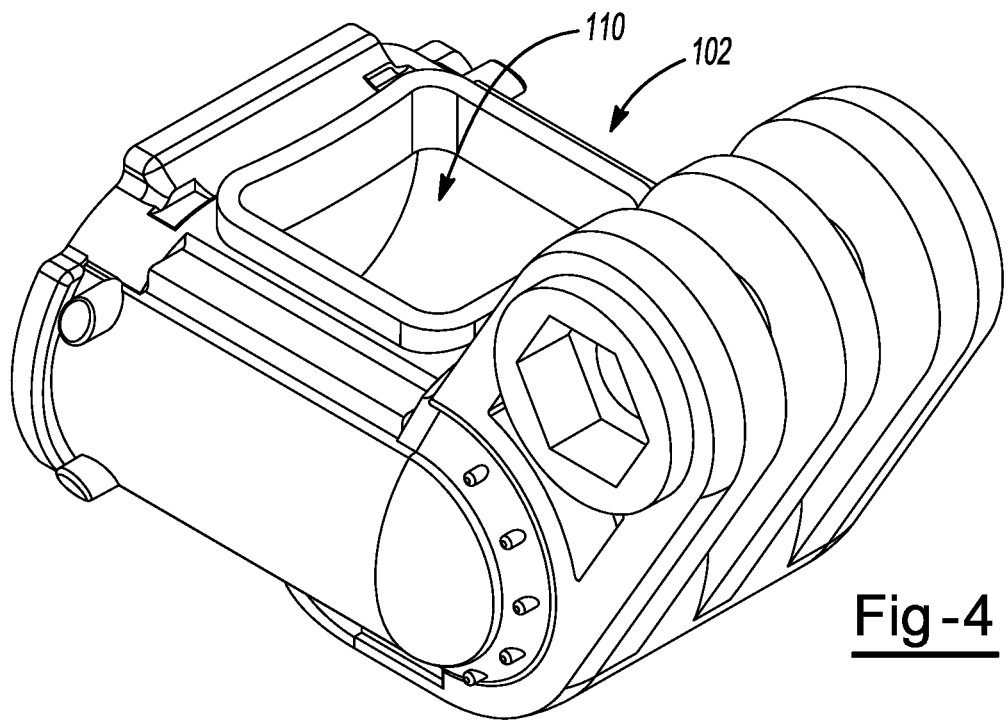
FIG. 4 depicts an alternative perspective view of the base of the improved mouth mount according to one or more embodiments shown and described herein.
Figure 5:
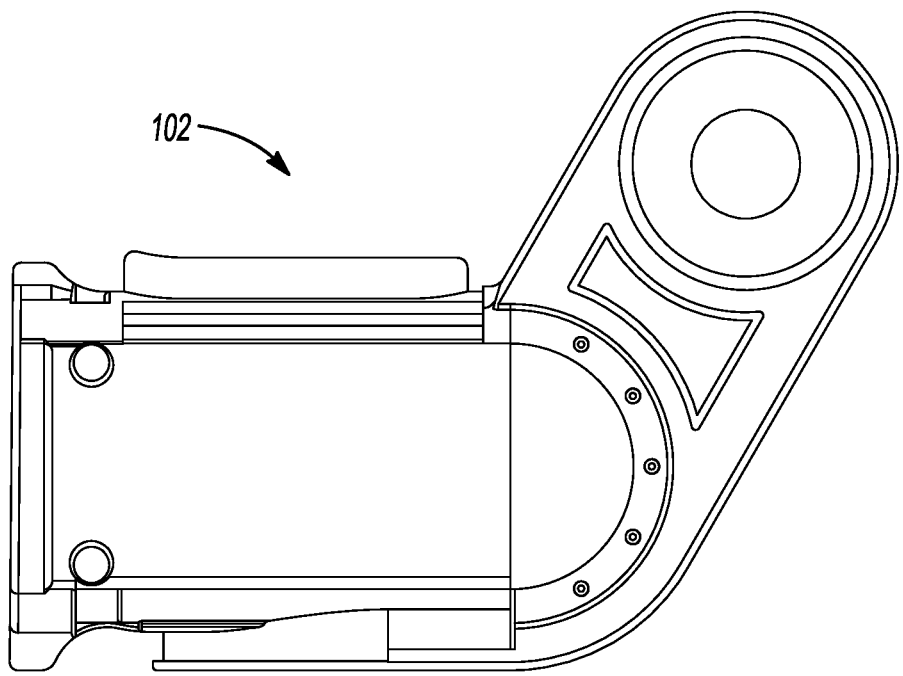
FIG. 5 depicts a side view of the base of the improved mouth mount according to one or more embodiments shown and described herein.

FIGS. 4 and 5 depict the base 102 alone and not connected to the overmold 104. FIG. 4 clearly illustrates the aperture 110 from a bottom view. The base 102 includes an elbow bend to allow the camera to extend downwards and away from the user's face. The camera connects to the base 102 By means of a screw, bolt, or other similar fastener. In the present embodiment, a thumbscrew is used made of an aluminum material. In the present environment, aluminum is preferred so as the user can use the product in water and/or saltwater without corrosion.

Figure 6:
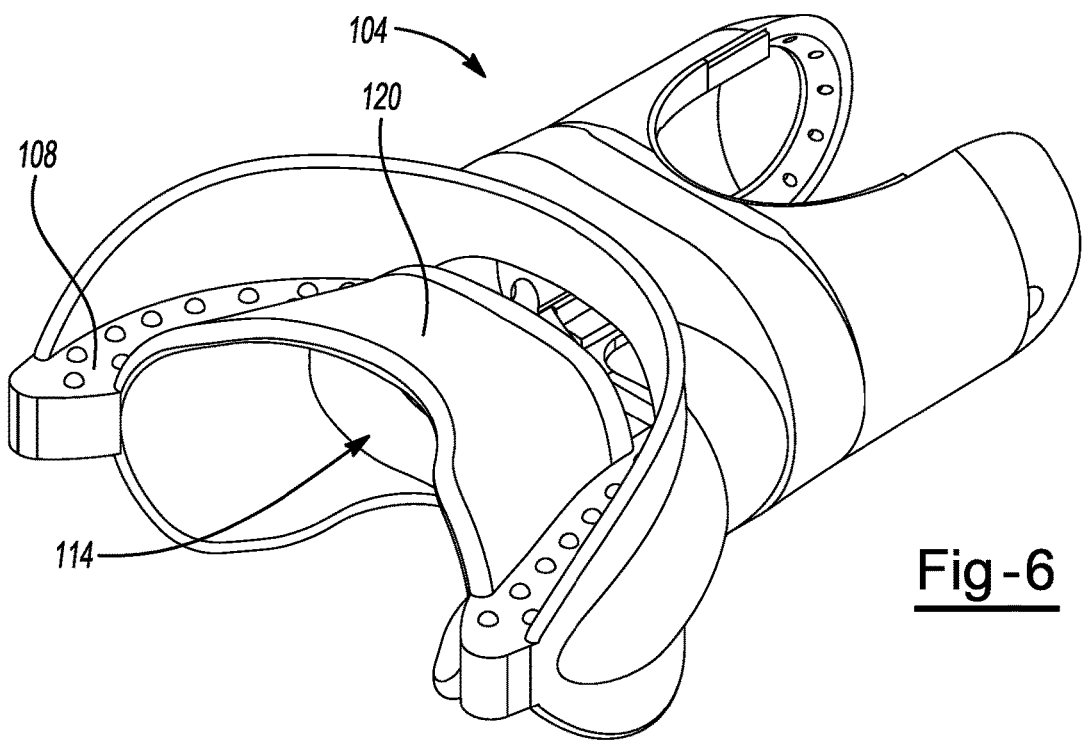
FIG. 6 depicts a perspective view of the overmold of the improved mouth mount according to one or more embodiments shown and described herein.
Figure 7:
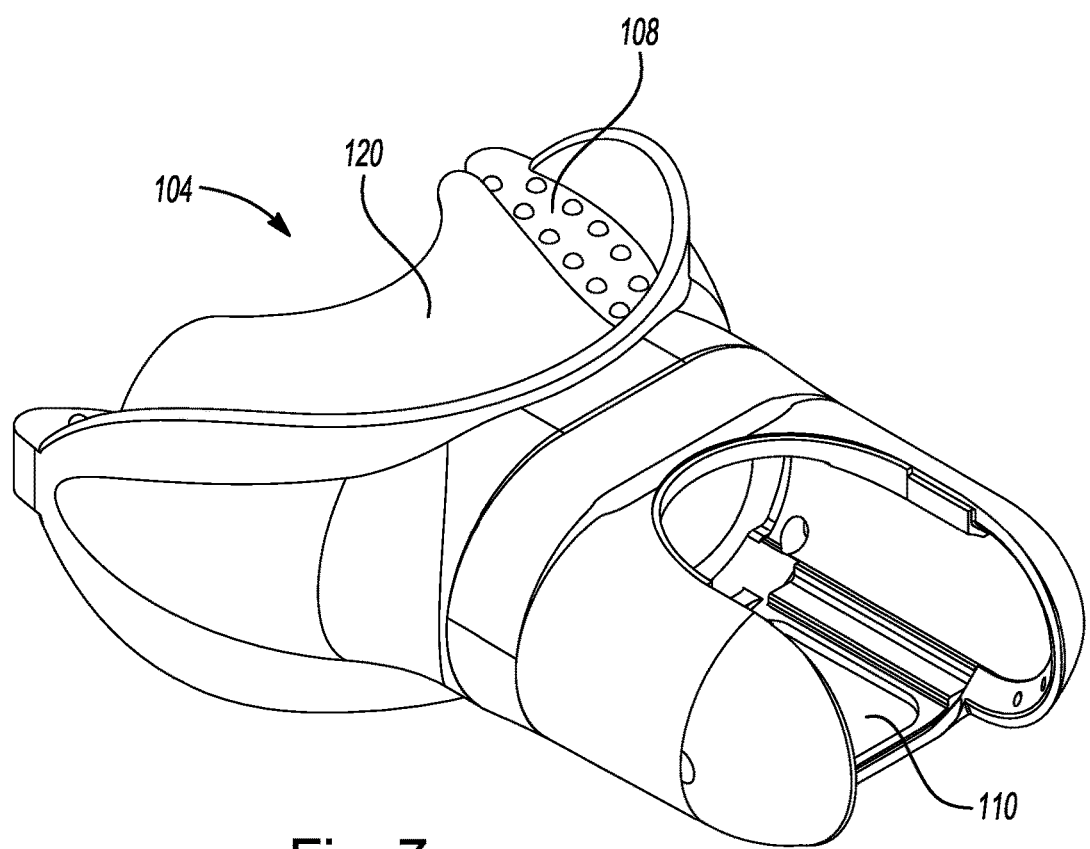
FIG. 7 depicts an alternative perspective view of the overmold of the improved mouth mount according to one or more embodiments shown and described herein.
Figure 8:
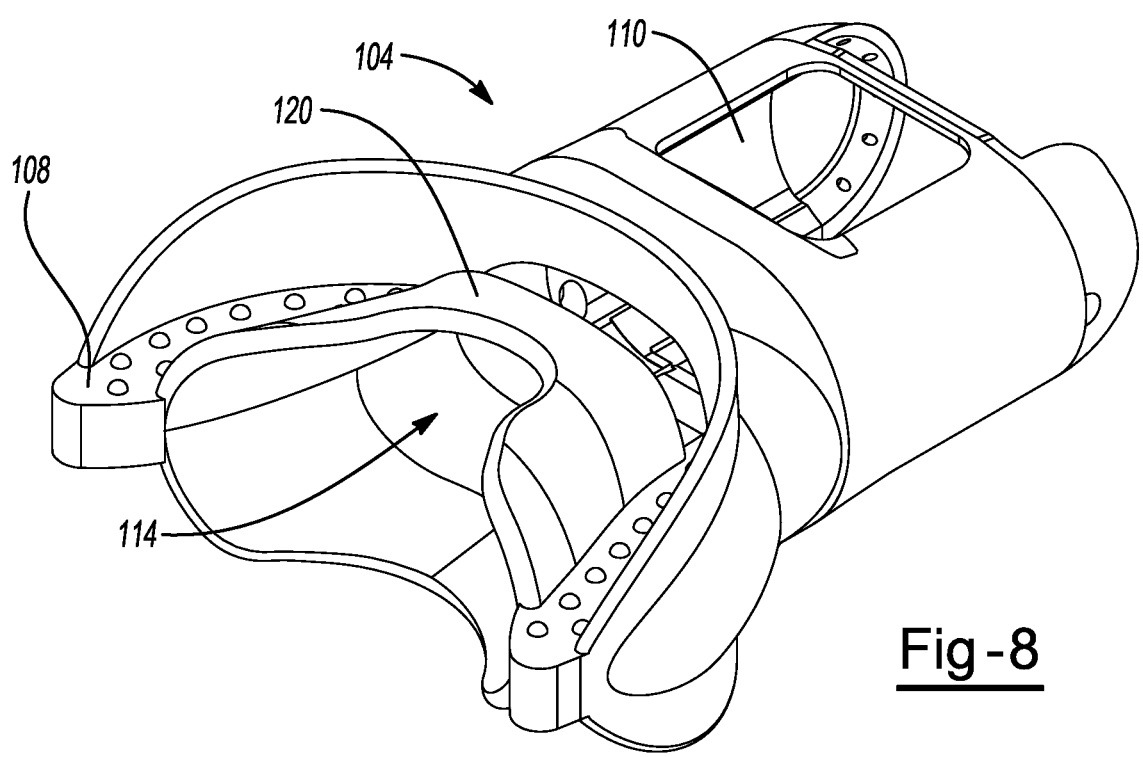
FIG. 8 depicts yet another an alternative perspective view of the overmold of the improved mouth mount according to one or more embodiments shown and described herein.

FIGS. 6-8 depict the overmold 104 of the mouth mount 100. In the present embodiment, the overmold 104 is made of a silicone material designed for comfortability and stability. In other embodiments, the overmold 104 may be made of any suitable material having strength and resiliency to achieve the results of the present disclosure. The overmold 104 is designed to be comfortable to fit within the mouth of the user allowing the user to bite down to stabilize the mouth mount 100.

A bridge 120 is shown illustrated in the aforementioned figures. The bridge 120 is configured to press against the mouth and/or teeth of a user when in use. The bridge 120 includes angled sidewalls 122 extending towards the flange or bite portion 108 (where the users places their teeth when in use). An upper lip 140 is configured to allow a user to wrap their mount around the lip 140 to properly hold the mount 100.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims (and/or any future claims filed in any Utility application) cover all such changes and modifications that are within the scope of the claimed subject matter.

What is claimed is:

1. A mount adapted to hold a camera by means of a user's mouth, the mount comprising:
    a base, the base having an upper surface, a lower surface, and a pair of opposed sidewalls connecting the upper surface to the lower surface, the base adapted to hold the camera;
    an overmold formed around the base, the overmold having a bite portion extending away from the base;
    the lower surface and an upper surface both positioned between a connection portion and the bite portion, the upper surface and the lower surface spaced apart by a pair of sidewalls, the lower surface being generally planar; and
    an aperture extending through both the overmold and the lower surface of the base, the aperture used to facilitate breathing by the user when the mount is in use.

2. The mount of claim 1 wherein the aperture covers at least 25% of the lower surface of the base so as to improve air flow.

3. The mount of claim 1 wherein the aperture covers at least 50% of the lower surface of the base so as to improve air flow.

4. The mount of claim 1 wherein the aperture is generally rectangular in shape.

5. The mount of claim 1 wherein the aperture is generally square in shape.

6. The mount of claim 1 wherein the aperture includes an elevated lip extending around the peripheral edge of the aperture.

7. The mount of claim 1 wherein the aperture is positioned on a generally planar portion of the lower surface.

8. A mount adapted to hold a camera by means of a user's mouth, the mount comprising:
    a base, the base having an upper surface, a lower surface, and a pair of opposed sidewalls connecting the upper surface to the lower surface, the base adapted to hold the camera;
    an overmold formed around the base, the overmold having a lip, the overmold having a bite portion extending away from the base, the bite portion having at least one bridge extending between each bite portion, the bridge spaced apart from the lip, the at least one bridge configured to rest adjacent to portions of their mouth.

9. The mount of claim 8 wherein two total bridges are provided including an upper and lower bridge.

10. The mount of claim 8 wherein the bite portion includes an upwardly extending lip, the bite portions extending generally perpendicularly away from the upwardly extending lip.

* * * * *